(12) United States Patent
Uchigashima et al.

(10) Patent No.: US 9,353,827 B2
(45) Date of Patent: May 31, 2016

(54) TOOTHED BELT

(75) Inventors: Shinji Uchigashima, Osaka (JP); Mitsuhiro Yamada, Nara (JP); Yohei Harada, Tochigi (JP); Akira Terasaki, Dublin, OH (US); Kaoru Shimamura, Tokyo (JP)

(73) Assignees: GATES UNITTA ASIA COMPANY, Osaka (JP); HONDA MOTOR CO., LTD., Tokyo (JP)

( * ) Notice: Subject to any disclaimer, the term of this patent is extended or adjusted under 35 U.S.C. 154(b) by 659 days.

(21) Appl. No.: 13/500,968

(22) PCT Filed: Aug. 31, 2010

(86) PCT No.: PCT/JP2010/064767
§ 371 (c)(1),
(2), (4) Date: Jun. 19, 2012

(87) PCT Pub. No.: WO2011/045984
PCT Pub. Date: Apr. 21, 2011

(65) Prior Publication Data
US 2012/0252619 A1    Oct. 4, 2012

(30) Foreign Application Priority Data
Oct. 13, 2009    (JP) .................................. 2009-236618

(51) Int. Cl.
F16G 1/06    (2006.01)
F16G 1/28    (2006.01)
F16G 1/10    (2006.01)

(52) U.S. Cl.
CPC ... *F16G 1/28* (2013.01); *F16G 1/10* (2013.01)

(58) Field of Classification Search
CPC ............... F16G 1/28; F16G 5/20; F16G 5/06; B29D 29/08
USPC .......................................... 474/268, 205, 263
See application file for complete search history.

(56) References Cited

U.S. PATENT DOCUMENTS

| | | | | |
|---|---|---|---|---|
| 4,392,842 A | * | 7/1983 | Skura et al. | 474/205 |
| 4,583,963 A | * | 4/1986 | Marsh et al. | 474/205 |
| 4,626,232 A | * | 12/1986 | Witt | 474/205 |
| 4,895,555 A | * | 1/1990 | Watanabe et al. | 474/260 |

(Continued)

FOREIGN PATENT DOCUMENTS

| | | |
|---|---|---|
| EP | 1930622 | 6/2008 |
| JP | 10-67886 | 3/1998 |

(Continued)

OTHER PUBLICATIONS

Extended European Search Report from European Patent Office (EPO) issued in European Patent Application No. EP10823252.1, dated Apr. 17, 2014.

*Primary Examiner* — Michael Mansen
*Assistant Examiner* — Michael Riegelman
(74) *Attorney, Agent, or Firm* — Greenblum & Bernstein P.L.C.

(57) ABSTRACT

Configuring the inside of a tooth portion 15 of a toothed belt 10 with a core rubber layer 14 and the outer periphery of the tooth portion 15 with a tooth rubber layer 12. Also, including short fibers in the core rubber layer 14. The tooth rubber layer 12 is formed by curing a rubber composition containing 10 parts by weight or less high-density polyethylene with 100 parts by weight of matrix rubber. The value of tan δ for the tooth rubber layer 12 at 100-120° C. is maintained at 0.100-0.120.

16 Claims, 7 Drawing Sheets

(56) References Cited

U.S. PATENT DOCUMENTS

| | | | |
|---|---|---|---|
| 5,306,213 A | | 4/1994 | Nakajima et al. |
| 5,362,281 A | * | 11/1994 | Dutton et al. ................. 474/205 |
| 5,536,214 A | * | 7/1996 | Akita et al. ................... 474/268 |
| 5,609,541 A | * | 3/1997 | Tachibana et al. ............ 474/205 |
| 6,028,143 A | | 2/2000 | Mukai |
| 6,419,775 B1 | * | 7/2002 | Gibson et al. ................. 156/137 |
| 7,749,118 B2 | * | 7/2010 | Baldovino et al. ............ 474/205 |
| 7,988,577 B2 | * | 8/2011 | Omori et al. .................. 474/249 |
| 8,197,372 B2 | * | 6/2012 | Wu et al. ....................... 474/263 |
| 2003/0004025 A1 | * | 1/2003 | Okuno et al. .................. 474/260 |
| 2007/0023127 A1 | * | 2/2007 | Onita et al. ................... 156/140 |
| 2007/0111834 A1 | * | 5/2007 | Matsuda et al. ............... 474/202 |
| 2007/0249451 A1 | * | 10/2007 | Wu et al. ........................ 474/263 |
| 2007/0249452 A1 | * | 10/2007 | South ............................. 474/263 |
| 2008/0132370 A1 | * | 6/2008 | Goettsch et al. ............... 474/268 |
| 2012/0295748 A1 | * | 11/2012 | Shiriike ......................... 474/148 |
| 2013/0337956 A1 | * | 12/2013 | Motozaki et al. .............. 474/205 |

FOREIGN PATENT DOCUMENTS

| | | |
|---|---|---|
| JP | 2000-266129 | 9/2000 |
| JP | 2008-185210 | 8/2008 |
| JP | 2009-127816 | 6/2009 |
| WO | 00/04098 | 1/2000 |

* cited by examiner

TOOTHED BELT

TECHNICAL FIELD

The present invention relates to a toothed belt applied under heavy load conditions, in particular, to a toothed belt applied in an internal combustion engine of an automobile and the like.

BACKGROUND ART

A toothed belt is widely used in an internal combustion engine to transmit the motive power from a crankshaft to a camshaft. Generally, a heavy load acts upon the toothed belt used in the internal combustion engine so that the life of the toothed belt tends to be relatively short. Recently, internal combustion engines are being downsized, and as a result, the width of toothed belts is also being reduced, so that heavier load acts on the toothed belt. Accordingly, the operating life of the toothed belt tends to be reduced, and moreover, noise is also more likely to be generated when the belt is engaged with a pulley and the like.

As a method for extending the belt life, emphasis may be placed on the rigidity of the belt teeth by improving the modulus of the tooth rubber. However, noise generated by the belt under operating conditions becomes more likely when the rigidity of the belt teeth is increased. In particular, internal combustion engines are often operated in a high-temperature environment (e.g., about 100-120° C.), and in such an environment noise performance and durability performance are likely to decrease.

In Patent Document 1, there is disclosed a high-density polyethylene that contains 20 percent by weight of high-density polyethylene having a cross-linkable part is compounded with a rubber composition to improve the properties for low heat build-up, heat resistance, high hardness and permanent set-in fatigue without compromising the fracture characteristics. However, in Patent Document 1, application of the high-density polyethylene to a belt is not suggested. Further, it is conceivable that improvement of noise performance during belt operation would be difficult by simply applying the rubber composition of Patent Document 1 to a belt, because hysteresis loss (tan $\delta$) is mitigated by cross-linking the high-density polyethylene to acquire the low heat build-up property.

Patent Document 1

Japanese Unexamined Patent Publication No. H10-067886

SUMMARY OF INVENTION

Problem to be Solved by the Invention

The present invention has been designed to resolve the above-mentioned problems and its object is to provide a toothed belt with improved noise performance while maintaining belt durability even though the belt is used in a high temperature environment.

Means for Solving the Problems

A toothed belt of the present invention comprises a belt body in which one face is provided with a tooth portion and a tooth bottom portion alternately in a belt longitudinal direction; the belt body comprising a tooth rubber layer arranged along the outer periphery of the tooth portion; and the tooth rubber layer being formed by curing a rubber composition containing 10 parts by weight or less of high-density polyethylene against 100 parts by weight of matrix rubber.

The belt body further comprises a core rubber layer configured inside of the tooth portion, and the tooth rubber layer may be preferably arranged to wrap the one face side of the core rubber layer. And the core rubber layer has a higher modulus than that of the tooth rubber layer. Further, the core rubber layer may be preferably loaded with short fibers.

The belt body comprises a backing rubber layer provided on its other face. The core rubber layer is provided between the backing rubber layer and the tooth rubber layer, and a cord element extending in the belt longitudinal direction is embedded in a boundary between the core rubber layer and the backing rubber layer. The toothed belt further comprises a tooth fabric that covers the outer surface of the tooth portion. The tooth fabric may preferably be subjected to an impregnation treatment using rubber cement containing the high-density polyethylene. The toothed belt may be applied in an internal combustion engine.

Effect of the Invention

In accordance with the present invention, the durability of the toothed belt in a high temperature environment is enhanced and the noise performance can be improved because tan $\delta$ is increased in the high temperature environment and the adhesive property between the belt body and the tooth fabric is improved by combining the high-density polyethylene with the tooth rubber layer.

EXPLANATION OF REFERENCES

10: toothed belt
11: belt body
12: tooth rubber layer
13: backing rubber layer
14: core rubber layer
15: tooth portion
16: tooth bottom portion
17: tooth fabric
18: cord element
20: short fiber
21: intermediate fabric

EMBODIMENT OF THE INVENTION

An embodiment of the present invention is described below with references to the drawings.

Figure 1:
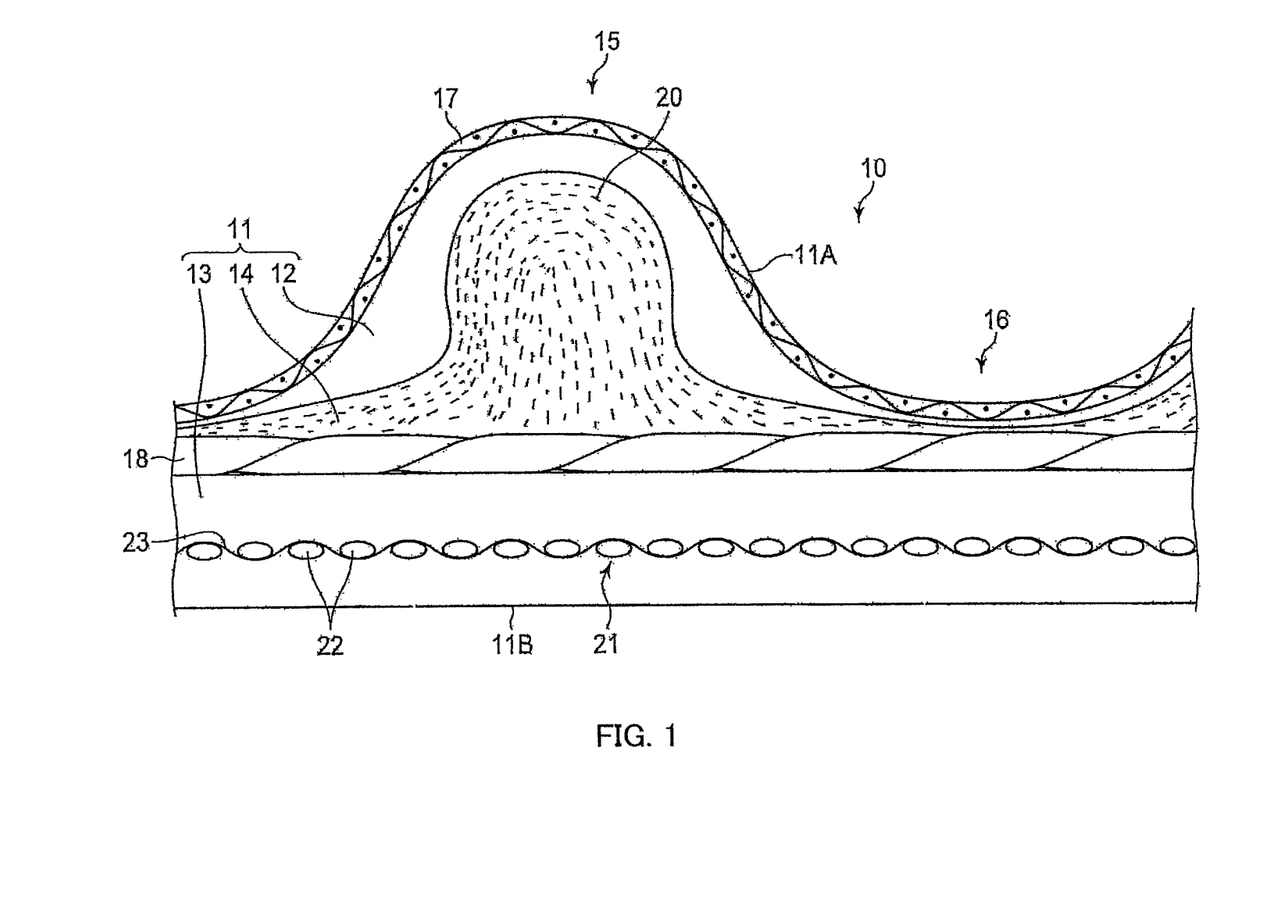
FIG. 1 is a side view of a toothed belt of the present embodiment.

FIG. 1 shows a toothed belt of an embodiment of the present invention. The toothed belt 10 may be an endless timing belt used in an internal combustion engine of an automobile and the like, and it may be a power transmission belt used to transmit motive power from a crankshaft to a camshaft by engaging with a pulley and the like.

The toothed belt 10 includes a belt body 11 and a cord element 18 embedded in the belt body 11 and extending in the belt longitudinal direction. The cord element 18 may be a pair of cords that are helically winded in the belt longitudinal direction of the toothed belt 10 so that a plurality of cords is arranged in the width direction to configure a tensile member of the belt 10. On the one face side (tooth surface) 11A, tooth portions 15 and tooth bottom portions 16 are alternately disposed in the longitudinal direction. The side 11A of the belt body 11, namely the surface of the tooth portions 15 and the tooth bottom portions 16, are covered with tooth fabric 17.

The belt body 11 is integrally formed with a tooth rubber layer 12 provided on the tooth surface 11A side of the belt body 11, a backing rubber layer 13 provided on the other side (back face) 11B of the belt body 11, and a core rubber layer 14 provided between the tooth rubber layer 12 and the backing rubber layer 13. The cord element 18 is positioned on the boundary surface between the backing rubber layer 13 and the core rubber layer 14, and the boundary surface between the backing rubber layer 13 and the core rubber layer 14 substantially coincides with the pitch zone of the belt 10. Namely, in the present embodiment, the back side of the belt body 11 is formed with the backing rubber layer 13 while the tooth surface side of the belt body 11, up to the cord element 18, is formed by laminating the tooth rubber layer 12 onto the core rubber layer 14.

The shape of the boundary surface between the core rubber layer 14 and the tooth rubber layer 12 corresponds to the shape of the tooth surface 11A, such that it is most distant from the pitch zone (cord element 18) at the center of the tooth portion 15 in the belt longitudinal direction, and it is proximate to the pitch zone (cord element 18) as it approaches the tooth bottom portion 16. Namely, inside the tooth portion 15, the core rubber layer 14 swells up corresponding to the shape of the tooth portion 15 and it constitutes the central portion of the inner part of the tooth portion 15. Further, the tooth rubber layer 12 in the tooth portion 15 is laminated over the core rubber layer 14 to cover the tooth surface 11A side of the core rubber layer 14 and is disposed along the tooth surface 11A. On the other hand, the core rubber layer 14 and the tooth rubber layer 12 both represent relatively thin layers at the tooth bottom portion 16 and in the vicinity of the tooth bottom portion 16.

The tooth rubber layer 12, the backing rubber layer 13 and core rubber layer 14 are formed by curing rubber compositions. As a rubber component for the rubber layers 12-14, HNBR (hydrogenated nitrile rubber), fluorine rubber, NBR (nitrile butadiene rubber), a mixture thereof, or a substance where one of these rubber components is mixed with another type of rubber and etc., may be used. However, among these rubber components, HNBR is preferably used. Further, as for the rubber components in the rubber layers 12-14, it is preferable to use the same type of rubber for all layers.

In addition to the rubber components, the rubber composition for each of rubber layers 12-14 contains various types of additives including a curing agent, an antioxidant, a curing accelerator, a carbon black and the like. Further, a metal salt of $\alpha,\beta$-ethylenically unsaturated carboxylic acid, such as zinc (meta)acrylate and the like is preferably incorporated into the rubber compositions of the rubber layers 12-14 to improve their strength. Further, as described later, the high-density polyethylene is mixed with the rubber composition of the tooth rubber layer 12 and short fibers are mixed into the core rubber layer 14.

A large number of short fibers 20 are nearly uniformly mixed into the core rubber layer 14 so that its modulus is made greater than those of the tooth rubber layer 12 and the backing rubber layer 13, neither of which have the short fibers 20 mixed within. Aramid short fiber, which has relatively high modulus, is preferably employed as the short fiber 20. In the present embodiment, the surface area of the tooth can be softened while maintaining the rigidity for the entire tooth portion 15 by increasing the modulus of the core rubber layer 14 so that it is greater than that of the tooth rubber layer 12. Therefore, the core rubber layer 14 protects against deformation of the tooth while mitigating the amount of noise generated during the belt operation, thus the growth of a crack in a tooth root or a tooth bottom is restrained and the durability of the tooth portion 15 can be improved.

Note that the modulus of a rubber layer is defined as the stress of a test piece obtained from vulcanizing the same rubber composition as the rubber layer, when it is elongated 20% under the JIS K6251 measurement. Note that for a rubber layer, in which short fibers are mixed, the short fibers are oriented in one direction of the test piece, and the modulus is defined by the measurement stretching the test piece in the above-orientated direction. Further, the test piece is vulcanized rubber extracted by using a dumbbell-shaped No. 5 type of the JIS K6251.

The short fibers are evenly distributed throughout the core rubber layer 14. Specifically, the short fibers 20 are substantially oriented in the belt thickness direction in a central area of the tooth portion 15; the fibers are slanted from the thickness direction the closer they are to the tooth surface from the central area so that the fibers lay along the tooth surface; and the fibers are substantially oriented in the belt longitudinal direction in the vicinity of the top of the tooth portion 15 and the tooth bottom portion 16.

In the present embodiment, the tooth rubber layer 12 is formed by vulcanizing a rubber composition containing the high-density polyethylene. With respect to the high-density polyethylene added to the rubber composition, a particulate or fibrous type may be used, and its surface may be subjected to a surface treatment in which OH group and/or COOH group is added. Note that in this specification, the high-density polyethylene is considered to have specific gravity of 0.92 or above, and preferably, the specific gravity is from 0.92 to 0.96. Further, the heat deflection temperature (according to ASTM-D648) of the high-density polyethylene, which is added to the rubber composition, may be about 100-130° C. and its viscometric average molecular weight is about 300,000-400,000. Note that the high-density polyethylene does not have a part that is cross-linkable with another molecule.

Due to the above-mentioned high-density polyethylene being included in the tooth rubber layer 12, tan δ of the tooth rubber layer 12 at about 100-120° C. measured by the dynamic mechanical analysis method falls within the range of 0.100-0.120. Note that tan δ corresponds to the ratio of the storage modulus (E') representing the elasticity and the loss modulus (E") representing the viscosity, which is referred to as the loss tangent (=E"/E'). In the present embodiment, because the tan δ of the tooth rubber layer 12 falls within the above-mentioned range under the high temperature environment, the load energy acting on a meshing face (a tooth surface 11A) is more effectively absorbed under the high temperature environment even though the belt 10 is operated under the high temperature environment, and thereby the noise generated during the meshing and etc., are prevented.

Further, the belt durability is improved because the adhesiveness between the tooth rubber layer 12 and the tooth fabric 17 is increased while maintaining the value of tan δ within the above-mentioned range by incorporating the high-density polyethylene having the above-mentioned characteristics into the tooth rubber layer 12. Further, the high-density polyethylene with the above-mentioned characteristics can be blended and compatibly mixed with the rubber composition in good conditions by a method discussed later. Furthermore, the effective tension during the belt operation can be reduced without lowering the rigidity by increasing the viscoelasticity (tan δ) of the rubber employed for the tooth portion 15.

Note that tan δ represents a measurement result for a test piece having thickness 1.9-2.7 mm, width of 6 mm and length of 5 mm. The test piece is made of a sample obtained by vulcanizing the rubber composition, which is the same as the tooth rubber layer, at 120° C. for 20 minutes. Further, in regard to the measurement system, a viscoelastic spectrometer of Shimadzu Corp. (brand name: Viscoelastic Test Machine Triton product TRITEC 2000) is employed and measurement is carried out under the measurement conditions of amplitude ±2.5% and a frequency of 1 Hz.

Referring to the rubber composition of the tooth rubber layer 12, the high-density polyethylene is blended 10 parts by weight or less, preferably 3-10 parts by weight, particularly 5-10 parts by weight with respect to 100 parts by weight of the matrix rubber. When the high-density polyethylene with only 3 parts by weight is combined, improvement of the durability and the noise performance are limited, and when more than 10 parts by weight is combined the durability and the noise performance will not substantially improve. Further, when 5-10 parts by weight is combined, the durability can be improved significantly. Note that "100 parts by weight of the matrix rubber" denotes the total amount of the rubber and the metal salt of the α,β-ethylenically unsaturated carboxylic acid when the rubber composition is compounded with the α,β-ethylenically unsaturated carboxylic acid, and it denotes 100 parts by weight of the rubber alone when the rubber is not compounded with the metal salt of the α,β-ethylenically unsaturated carboxylic acid.

It is preferable for the backing rubber layer 13 and the core rubber layer 14 to not be substantially compounded with the high-density polyethylene. It is because the backing rubber layer 13 and the core rubber layer 14 are away from the meshing surface (the tooth surface 11A), which engages with a pulley, so that there is no need to absorb the load energy applied to the belt meshing surface. Further, it will be difficult to improve the durability of the tooth portion when the high-density polyethylene is blended into the core rubber layer 14.

The rubber composition of the tooth rubber layer 12 (namely, tooth rubber sheet 12', see FIG. 2) is prepared as described below. First, the additives containing the high-density polyethylene other than the curing agent are mixed with the rubber or the matrix rubber (the primary mixing). In this process, the mixing temperature is equal to or greater than the heat deflection temperature of the high-density polyethylene, so that the high-density polyethylene existing in a softened state is mixed into the rubber, blended and compatibly mixed in good condition. The curing agent is then added to the rubber composition resulting from the primary mixing, and the composition is mixed (secondary mixing) at a temperature below the vulcanization temperature of the curing agent (below the primary mixing temperature), and after that, the tooth rubber sheet 12' is obtained by a calender process. Note that it is not necessary to mix the rubber composition of the tooth rubber layer 12 by the above-mentioned method unless the high-density polyethylene is mixed with the rubber compounds at a temperature greater than or equal to the heat deflection temperature and the curing agent is mixed with the rubber compounds at a temperature below the vulcanization temperature. For example, additives other than the curing agent may be added in the secondary mixing.

An intermediate fabric 21 arranged substantially in parallel with the pitch zone (or the cord element 18) is embedded in the backing rubber layer 13, at a position separate from the cord element 18. The intermediate fabric 21 extends planarly in both the belt longitudinal direction and the belt width direction and is provided throughout in both the belt longitudinal direction and the width direction. The intermediate fabric 21 is a fabric having high rigidity in the belt width direction and is strethable in the belt belt longitudinal direction. As for the intermediate fabric 21, a fabric with the elastic modulus of 100 GPa or above in the belt width direction is preferably employed, and more preferably, a fabric with the elastic modulus of 180-240 GPa is employed. Note that the elastic modulus is measured based on the resistance of incipient tension as defined in JIS L1095 9.13.

The intermediate fabric 21 is woven fabric with warp extending in the belt width direction and weft extending in the belt longitudinal direction; twill fabric or plain fabric, for example. No stretch yarn of high rigidity is used as the warp 22 of the intermediate fabric 21. For example, fiber that is composed of aramid fiber, poly-phenylene-benzobisoxazole (PBO) fiber, carbon fiber, or blending fiber thereof, is employed. Stretch yarn, such as crimped nylon yarn of wooly nylon and the like, is used as the weft 23.

In the present embodiment, the torsional rigidity of the toothed belt 10 is improved without increasing the rigidity of the tooth portion 15, because the intermediate fabric 21 having high rigidity in the belt width direction is embedded in the backing rubber layer 13, and thereby, stress concentration in the tooth width direction during the belt operation can be reduced. When the stress concentration in the belt width direction in reduced, the load acting against the belt is uniformly distributed in the belt width direction and the durability of the belt can be enhanced. Further, the intermediate fabric 21 can easily be installed on a toothed mold in the latter-described manufacturing process because stretch yarn is used as the yarn extending in the belt longitudinal direction of the intermediate fabric. As a result, the ability of the belt to be molded can be improved. Note that the intermediate fabric 21 may be excluded in the present embodiment.

The tooth fabric 17 may preferably include polyalylate fiber. The tooth fabric 17 may be composed of woven fabric woven from warp extending in the belt width direction and weft extending in the belt longitudinal direction, and the weft may preferably includes polyalylate. For example, the weft may be bicomponent filament yarn including yarn composed of polyalylate fiber and yarn composed of fiber having higher stretchability than the polyalylate fiber (hereafter, referred to as highly stretchable fiber yarn). The bicomponent filament yarn may employ the highly stretchable fiber yarn as core yarn with polyalylate fiber yarn wrapped about the core yarn, and further, the polyalylate fiber yarn is wrapped with covering yarn.

For example, urethane elastic yarn and the like is used for the above-mentioned highly stretchable fiber yarn, and yarn composed of nylon fiber, polyester fiber and the like is used for the covering yarn. The polyalylate fiber, which is used as the weft, comprises fully aromatic polyester, specifically; VECTRAN (a brand name for a KURARAY Co., Ltd. product) may be used. The material of the warp of the tooth fabric 17 may comprise—but is not limited to—nylon fiber or polyester fiber and the like.

The tooth fabric 17 may preferably be subjected to rubber cement impregnation treatment, such that soaking the fabric in the rubber cement and drying it before it is adhered to the tooth surface 11A of the belt body 11. Thereby, the rubber cement is vulcanized during the vulcanization molding so that the tooth fabric 17 more easily adheres to the tooth rubber layer 12. The rubber cement preferably contains high-density polyethylene in addition to rubber components. As for the high-density polyethylene, the same material that was blended to the tooth rubber layer 12 is used. Because containment of the high-density polyethylene in the rubber cement improves the adhesive between the tooth rubber layer 12 and the tooth fabric 17, and further reduces the friction coefficient of the tooth surface, the life of the belt 10 can be extended. Moreover, since the high-density polyethylene having the above-mentioned characteristics can be sufficiently mixed and is compatible with the rubber components of the rubber cement, separation from the tooth fabric during operation of the belt is prevented.

As for the rubber cement, the high-density polyethylene may be preferably blended 15 to 40 parts by weight with 100 parts by weight of the rubber components. When the formulation of the high-density polyethylene is less than 15 parts by weight, a reduction in the friction coefficient of the belt is limited and the adhesion between the tooth fabric 17 and the tooth rubber layer 12 is insufficient. Further, when more than 40 parts by weight of the high-density polyethylene is blended, the friction coefficient, especially under a high temperature environment, is increased due to tackiness caused by the softening of the high-density polyethylene, and in turn, the durability of the belt may not be sufficiently improved. Preferably, 24-40 parts by weight of the high-density polyethylene may be blended with respect to 100 parts by weight of the rubber components of the rubber cement to enhance the durability of the belt, and further, 24-32 parts by weight may be even more preferably blended to increase the bonding strength between the tooth fabric 17 and the tooth rubber layer while sufficiently reducing the friction coefficient.

The rubber cement is a rubber composition in which various types of additives containing the high-density polyethylene, a curing agent, an antioxidant, a vulcanization accelerator, carbon black and the like are blended to rubber, and further organic reinforcing materials of phenol resin and the like, along with a solvent, are added thereto. As for a rubber component of the rubber cement, rubber of the same type as the exemplary rubber listed for the rubber layer 12-14 is employed; however, the HNBR and/or rubber of the same type with the rubber layer 12 may be preferably used. Further, when the rubber composition of the rubber cement contains the high-density polyethylene, the rubber composition may be preferably obtained by mixing the composition in the same manner as the rubber composition of the tooth rubber layer 12.

Figure 2:
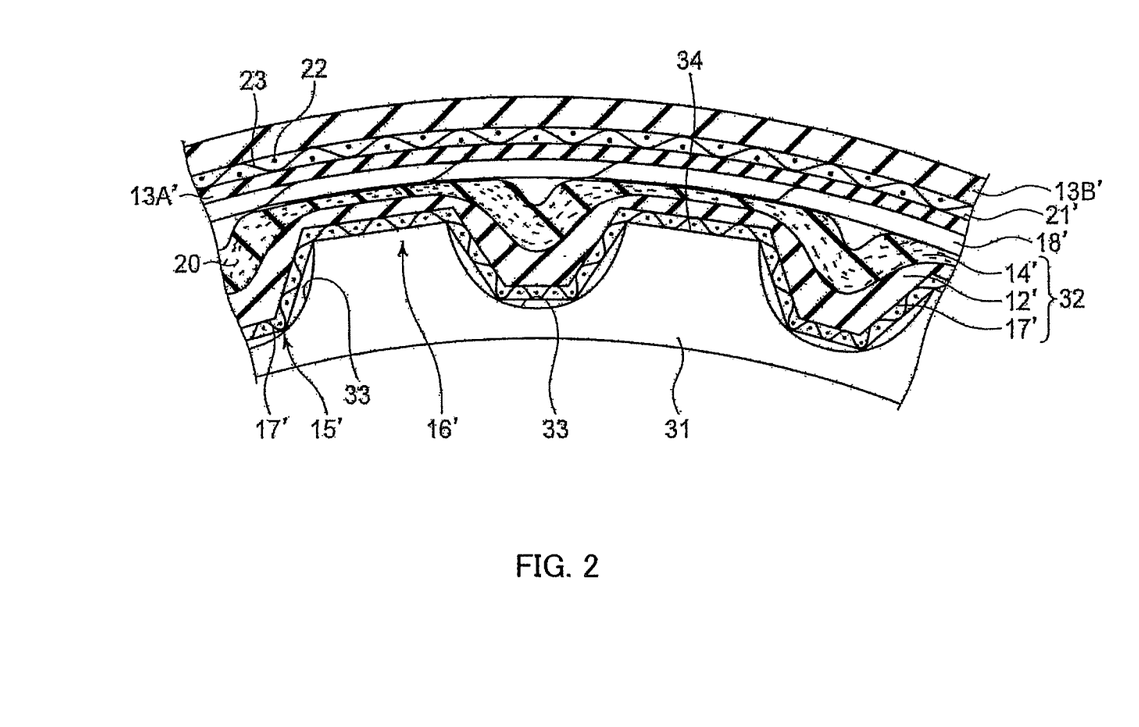
FIG. 2 is a sectional view schematically illustrating a method for manufacturing the toothed belt.
Figure 3:
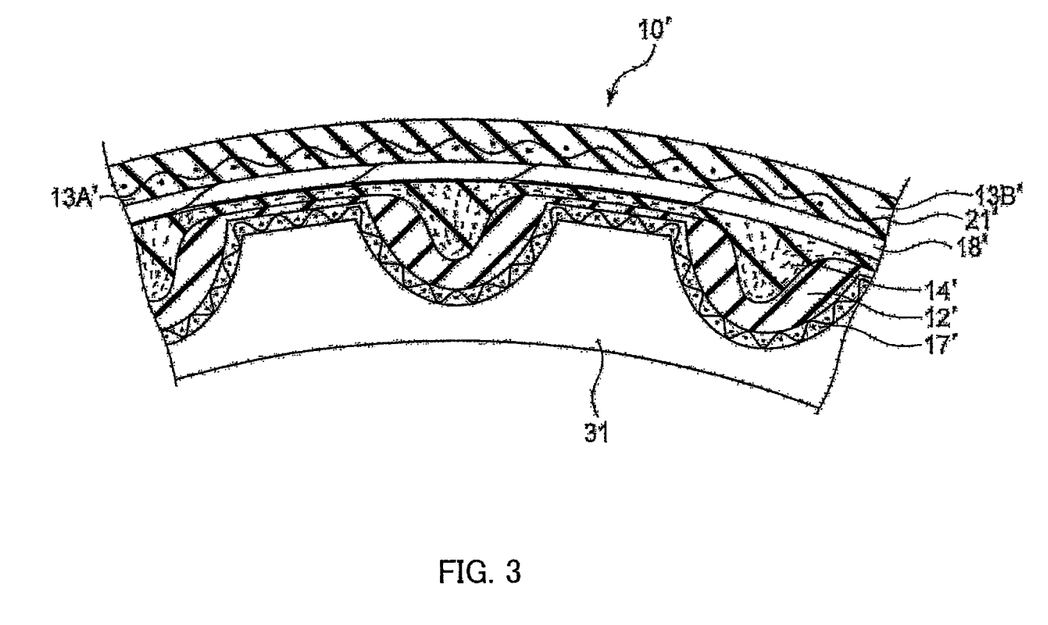
FIG. 3 is a sectional view schematically illustrating a method for manufacturing the toothed belt.

Next, the manufacturing process for the toothed belt 10 will be explained with reference to FIGS. 2 and 3. FIG. 2 indicates a process of wrapping a toothed mold 31 with a rubber-provided preformed tooth fabric 32, a cord 18', and an intermediate fabric 21' attached with a first backing rubber sheet 13A' and a second backing rubber sheet 13B'. Note that the tooth rubber sheet 12', a core rubber sheet 14' and the backing rubber sheets 13A' and 13B' appear to be the same as the tooth rubber layer 12, the core rubber layer 14 and the backing rubber layer 13 after the vulcanization molding. The above-mentioned rubber sheets are unvulcanized rubber compositions, each formed into a sheet, and the core rubber sheet 14' is loaded with short fibers 20. Further, a tooth fabric 17', the cord 18' and the intermediate fabric 21' will appear as the tooth fabric 17, the cord element 18 and the intermediate fabric 21.

In the present method, the tooth fabric 17' subjected to the impregnation treatment in the above-mentioned rubber cement is preformed into a corrugate-shape and the tooth portion 15' and the tooth bottom portion 16' are alternately provided on the tooth fabric 17' in a predetermined direction. The tooth rubber sheet 12' and the core rubber sheet 14' are then pressed and attached to the preformed tooth fabric 17' in this order, and integrated to provide the rubber-provided preformed tooth fabric 32. In this process, the tooth rubber sheet 12' and the core rubber sheet 14' are compressed and bonded relatively thickly on the tooth portion 15' of the tooth fabric 17' while compressed relatively thinly on the tooth bottom portion 16'. Further, before the press-bonding process is performed, the short fibers 20 in the core rubber sheet 14' are oriented in the above-mentioned direction; however, the short fibers 20 are oriented in directions along the profile of the tooth portion inside the tooth portion 15'.

The toothed mold 31 for vulcanization molding the toothed belt 10 is then prepared. The toothed mold 31 has a cylindrical shape and its outer circumferential surface has a shape that coincides with the shape of the tooth surface of the belt 10, such that a concave portion 33 and a convex portion 34 are alternately provided in the circumferential direction. First, the rubber-provided preformed tooth fabric 32 is wrapped around the circumferential surface of the toothed mold 31 with each of the tooth portions 15' being disposed inside each of the concave portions 33. Note that each of the tooth portions 15' is normally not formed completely identical to the concave portion 33 so that a gap exists between the tooth portion 15' and the concave portion 33.

The cord 18' is then helically wrapped around the core rubber sheet 14' of the rubber-provided preformed tooth fabric 32. Upon the wound cord 18' the intermediate fabric 21' attached to the first backing rubber sheet 13A' of predetermined thickness is wrapped with the backing rubber sheet 13A' facing inward toward the mold 31 and toward the cord 18'. However, the first backing rubber sheet 13A' may be treated as a distinct member from the intermediate fabric 21', such that the first backing rubber sheet 13A' and the intermediate fabric 21' may be wrapped about the cord 18' in this order. Note that the warp 22 is aligned in the axial direction of the mold 31 and the weft 23 is aligned in the circumferential direction of the mold 31 in this process. Upon the wound intermediate fabric 21' the second backing rubber sheet 13B' is further wrapped. The toothed mold 31, which is wrapped with the rubber-provided preformed tooth fabric 32 and so on, is installed inside a vulcanizer (not shown). Inside the vulcanizer, the rubber-provided preformed tooth fabric 32 and the other materials wrapped about the toothed mold 31 may be heated by steam and pressed inwardly from the outside by a vulcanizing bag and the like, which may be provided inside the vulcanizer.

By the above-mentioned pressing and heating, the rubber sheets 12', 13A', 13B' and 14' are pressed inwardly with enhanced liquidity so that the second backing rubber sheet 13B' flows through a space between the warp 22 and the weft 23 of the intermediate fabric 21' into the inner space where it is integrated with the first backing rubber sheet 13A'. Thereby, the intermediate fabric 21' is embedded inside the backing rubber sheets 13A' and 13B'. Further, the cord 18' is also embedded between the backing rubber sheet 13A' and the core rubber sheet 14'. Further, the tooth fabric 17' is pressed by these rubber sheets into a shape that coincides with the outer circumferential surface of the mold 31 to form the tooth surface of the belt. In this process, a portion of the short fibers 20 are further oriented in the belt thickness direction so that the short fibers 20 inside the core rubber sheet will be orientated as illustrated in FIG. 1. Further, each of the rubber sheets is vulcanized by the above-mentioned pressing and heating, and each of the rubber sheets, tooth fabric 17', intermediate fabric 21' and cord 18' are integrated so that the belt slab 10' as shown in FIG. 3 is obtained. The belt slab 10' is removed from the toothed mold 31, grinded and then cut to be formed into the toothed belt 10 (refer to FIG. 1).

EXAMPLES

Hereafter, examples are shown to represent a specific example of the present embodiment; however, the present invention should not be restricted to the examples described below.

Working Example 1

Fabric of which the warp and weft were woven by a 2/2 twill was prepared as the tooth fabric. The warp of the tooth fabric was filament yarn of 110 dtex nylon 66, while the weft was bicomponent filament yarn in which core yarn was 470 dtex urethane elastic yarn wrapped with 280 dtex polyalylate fiber yarn [VECTRAN (a brand name for a KURARAY Co., Ltd. product)] and the polyalylate fiber yarn further wrapped with covering yarn of 110 dtex nylon 66. The tooth fabric was then subjected to the impregnation treatment, such that it was dipped in rubber cement containing a rubber composition represented in Table 1, and dried (at 100° C. for min.). The rubber cement was obtained by mixing the rubber component with the additives other than the curing agent at above 120° C. (the primary mixing); then mixing in the curing agent at a temperature below the vulcanization temperature of the curing agent (the secondary mixing) to obtain the rubber composition; and then adding MEK and phenol resin to the rubber composition. As for the rubber cement, the weight ratios of the rubber composition, the phenol resin and MEK were 100:33:500.

TABLE 1

| INGREDIENT | | PART BY WEIGHT |
|---|---|---|
| RUBBER COMPONENT | HNBR POLYMER | 100 |
| ADITIVES | HDPE | 24 |
| | CARBON BLACK | 60 |
| | ZnO | 5 |
| | PLASTISIZER | 10 |
| | STEARIC ACID | 1 |
| | ANTIOXIDANT | 3.5 |
| | PEROXIDE BASED CURING AGENT | 4 |

*Zetpol 2020 (brand name for a ZEON Corp. product) was used as a rubber component and INHANCE PEF fiber (brand name for a FLUOROSEAL INC. product) was used as HDPE (high-density polyethylene).

The backing rubber sheet (the first and second backing sheets), the core rubber sheet and the tooth rubber sheet containing the rubber composition represented in Table 2 were prepared. In Working Example 1, as for the tooth rubber sheet, 3 parts by weight of the high-density polyethylene was blended with 100 parts by weight of the matrix rubber. Note that the tooth rubber sheet was obtained by subjecting to a calender process a rubber composition that was mixed by the same method applied to the rubber composition of the rubber cement. Further, aramid short fibers of fiber length 1 mm were loaded into the core rubber sheet and the modulus of the core rubber sheet was greater than the modulus of the first and second backing rubber sheet and the tooth rubber sheet. The tooth fabric subjected to the impregnation treatment using the rubber cement was preformed and the tooth rubber sheet and the core rubber sheet were press-bonded to the tooth fabric to obtain the rubber-provided preformed tooth fabric. Further, the first backing rubber sheet was applied to one side of the intermediate fabric.

TABLE 2

| INGREDIENT | | TOOTH RUBBER | CORE RUBBER | BACKING RUBBER |
|---|---|---|---|---|
| MATRIX RUBBER | HNBR POLYMER | 70 | 40 | — |
| | POLYMER CONTAINING ZINC DIMETHACRYLATE(1) | 30 | 60 | — |
| | POLYMER CONTAINING ZINC DIMETHACRYLATE(2) | — | — | 120 |
| | HNBR/(HNBR + ZINC DIMETHACRYLATE) | 0.865 | 0.73 | 0.83 |
| | ZINC DIMETHACRYLATE/(HNBR + ZINC DIMETHACRYLATE) | 0.135 | 0.27 | 0.17 |
| ADDITIVES | SHORT FIBER | — | 4 | — |
| | HDPE | 0-15 | — | — |
| | CARBON BLACK | 10 | 10 | 20 |
| | SILICA | 30 | 30 | — |
| | ZnO | 10 | — | — |
| | PLASTISIZER | 8 | 8 | 10 |
| | STEARIC ACID | 1.5 | 1.5 | 1 |
| | ACCELARATOR | — | 4 | 6 |
| | ANTIOXIDANT | 3 | 3 | 3 |
| | PEROXIDE BASED CURING AGENT | 12 | 12 | 23 |

*1 In the table, weight ratio is indicated for HNBR/(HNBR + ZINC DIMETHACRYLATE) and ZINC DIMETHACRYLATE/(HNBR + ZINC DIMETHACRYLATE), and parts by weight is indicated for the others.
*2 HNBR polymer is HNBR of the hydrogenated rate 99%.
*3 POLYMER CONTAINING ZINC DIMETHACRYLATE (1) is a rubber matrix with blend ratio (weight ratio) of HNBR to zinc dimethacrylate of 55:45 and having a hydrogenated rate of HNBR 99%.
*4 POLYMER CONTAINING ZINC DIMETHACRYLATE (2) is a rubber matrix with blend ratio (weight ratio) of HNBR to zinc dimethacrylate of 83:17 and having a hydrogenated rate of HNBR 96%.
*5 INHANCE PEF fiber (brand name for a FLUOROSEAL INC. product) is used as HDPE.

The rubber-provided preformed tooth fabric, cord, and intermediate fabric attached with first and second backing rubber sheets were wrapped around the mold in this order. As for the intermediate fabric, woven fabric of which weft of wooly nylon yarn of 470 dtex nylon 66 and warp of 440 dtex twisted yarn of aramid fiber (brand name TECHNORA HM of TEIJIN product) were plainly woven with the weft of the woven fabric aligned in the circumferential direction of the mold. The modulus of elasticity of the intermediate fabric in the warp direction (corresponds to the belt width direction) before it was wrapped around the mold was 100 GPa. The rubber sheet and other materials installed on the mold were subjected to vulcanization molding by heating and pressing in the vulcanizer to obtain the belt slab. The belt slab was ground and cut to obtain a toothed belt with belt width of 16 mm, circumferential length of 900 mm and a tooth count of 92.

Working Example 2

Working Example 2 was implemented in the same manner as Working Example 1 except that 5 parts by weight of the high-density polyethylene was compounded with 100 parts by weight of the matrix rubber of the tooth rubber sheet.

Working Example 3

Working Example 3 was implemented in the same manner as Working Example 1 except that 10 parts by weight of the high-density polyethylene was compounded with 100 parts by weight of the matrix rubber of the tooth rubber sheet.

Comparative Example 1

Comparative Example 1 was implemented in the same manner as Working Example 1 except that no high-density polyethylene was compounded with the matrix rubber of the tooth rubber sheet.

Comparative Example 2

Comparative Example 2 was implemented in the same manner as Working Example 1 except that 15 parts by weight of the high-density polyethylene was compounded with 100 parts by weight of the matrix rubber of the tooth rubber sheet.

[Evaluation of Belts]

Tan δ for all of the tooth rubber layers of Working Examples 1-3 and Comparative Examples 1-2 under 100, 120 and 140° C. were measured in accordance with the above-mentioned method. The results of the tan δ measurements are listed in Table 3. As shown in Table 3, it can be appreciated that tan δ at 100° C. and 120° C. for Working Examples 1-3 falls within the range 0.100-0.120. On the other hand, as shown in Table 3, it can be appreciated that tan δ at 100° C. and 120° C. for Comparative Examples 1-2 fall outside the range 0.100-0.120. Furthermore, as apparent from Table 3, the value of tan δ in the range 100° C.-140° C. is kept within 0.100-0.120 by adding 10 parts by weight (PBW) of the high-density polyethylene, which can be appreciated that the rates of change of tan δ is small under high temperature conditions.

TABLE 3

|  | HDPE | tan δ | | |
| --- | --- | --- | --- | --- |
|  | (HPR) | 100° C. | 120° C. | 140° C. |
| WORKING EXAMPLE 1 | 3 | 0.1128 | 0.1124 | 0.1109 |
| WORKING EXAMPLE 2 | 5 | 0.1148 | 0.1143 | 0.1135 |
| WORKING EXAMPLE 3 | 10 | 0.1184 | 0.1151 | 0.1115 |
| COMPARATIVE EXAMPLE 1 | 0 | 0.0997 | 0.0978 | 0.0956 |
| COMPARATIVE EXAMPLE 2 | 15 | 0.1251 | 0.1196 | 0.1135 |

Figure 4:
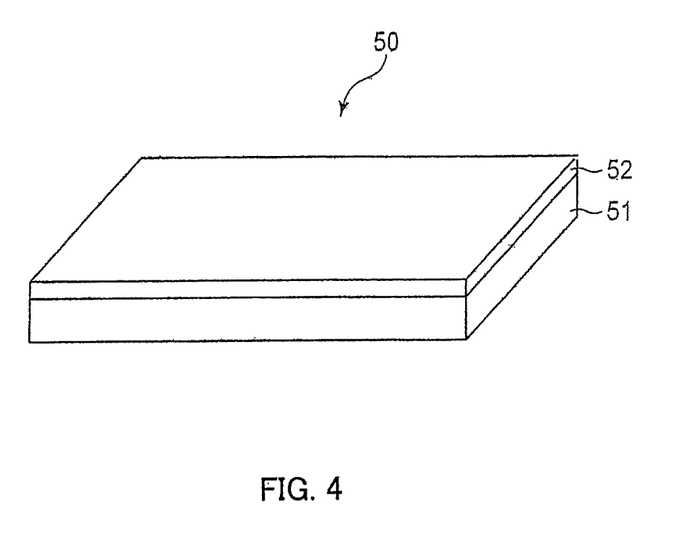
FIG. 4 is a perspective view illustrating an adhesion test sample used in an adhesive strength test.

The bonding strength between the tooth fabric and the tooth rubber layer of Working Examples 1-3 and Comparative Examples 1-2 was evaluated through bond-strength testing. In this test, a bond-strength test sample 50, as illustrated in FIG. 4, was used. A tooth fabric and an unvulcanized rubber sheet were integrated into the bond-strength test sample 50 by arranging the tooth fabric on an unvulcanized rubber sheet and then vulcanizing them at 160° C. for 20 minutes under pressure applied by a press machine. The dimensions of the bond-strength test sample 50 were 100 mm in length, 25 mm in width and 4 mm in thickness. As for the unvulcanized rubber sheets for all of the Working Examples and the Comparative Examples, a rubber composition containing the same components was used; and as for the tooth fabric for all of the Working Examples and the Comparative Examples, a tooth fabric that was subjected to the same impregnation treatment was used.

Figure 5:
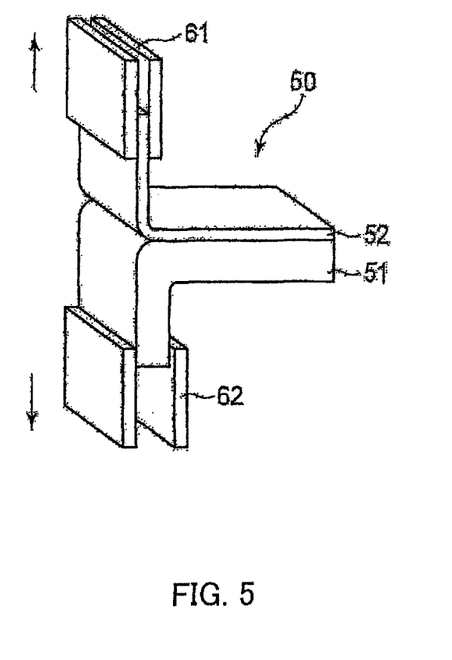
FIG. 5 is a perspective view showing an appearance when the adhesion test sample is installed on a tension measurement apparatus.

FIG. 5 illustrates how the bond-strength test sample was installed on a tension measurement apparatus. As shown in FIG. 5, the tooth fabric 52 and the rubber sheet 51 of the bond-strength test sample 50 were slightly separated so that the end of the tooth fabric 52 was pinched by a chuck 61 and the end of the rubber sheet 51 was pinched by a chuck 62. Both of the ends were pulled at the rate of 50 mm/min until they were split away from one another. The force required for this separation was determined to be the bond strength. The bond strength testing was performed under high temperature conditions of 120° C. The results of the bond strength testing are shown in Table 4.

TABLE 4

|  | HDPE (PHR) | BOND STRENGTH (N/25 mm) |
| --- | --- | --- |
| WORKING EXAMPLE 1 | 3 | 210 |
| WORKING EXAMPLE 2 | 5 | 230 |
| WORKING EXAMPLE 3 | 10 | 235 |
| COMPARATIVE EXAMPLE 1 | 0 | 180 |
| COMPARATIVE EXAMPLE 2 | 15 | 245 |

Figure 6:
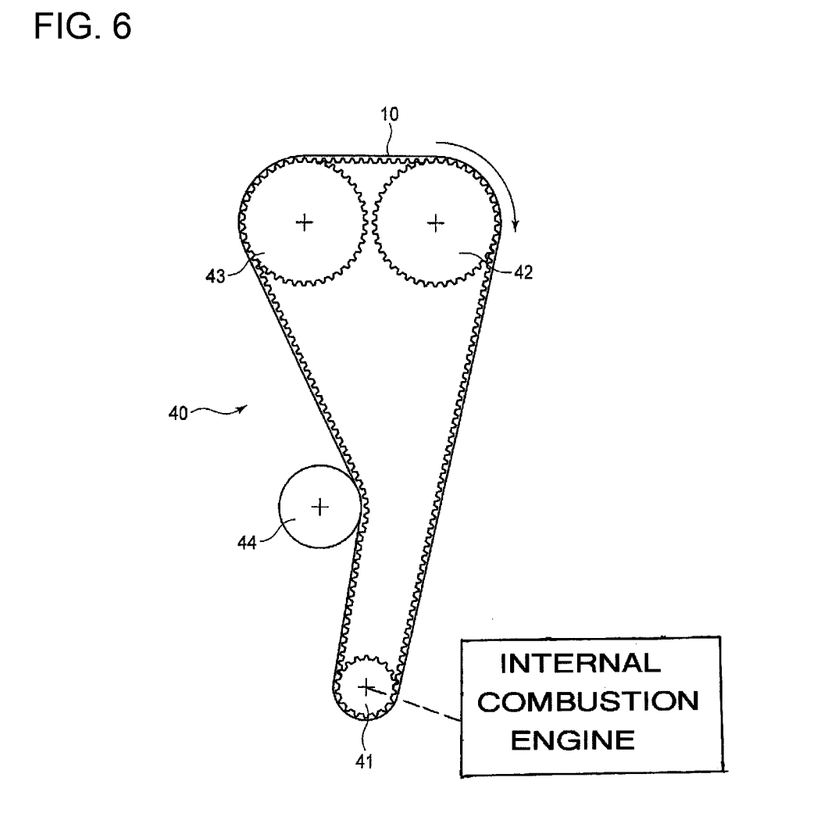
FIG. 6 is a schematic diagram illustrating a layout of a power transmission system employed in a durability performance test.
Figure 7:
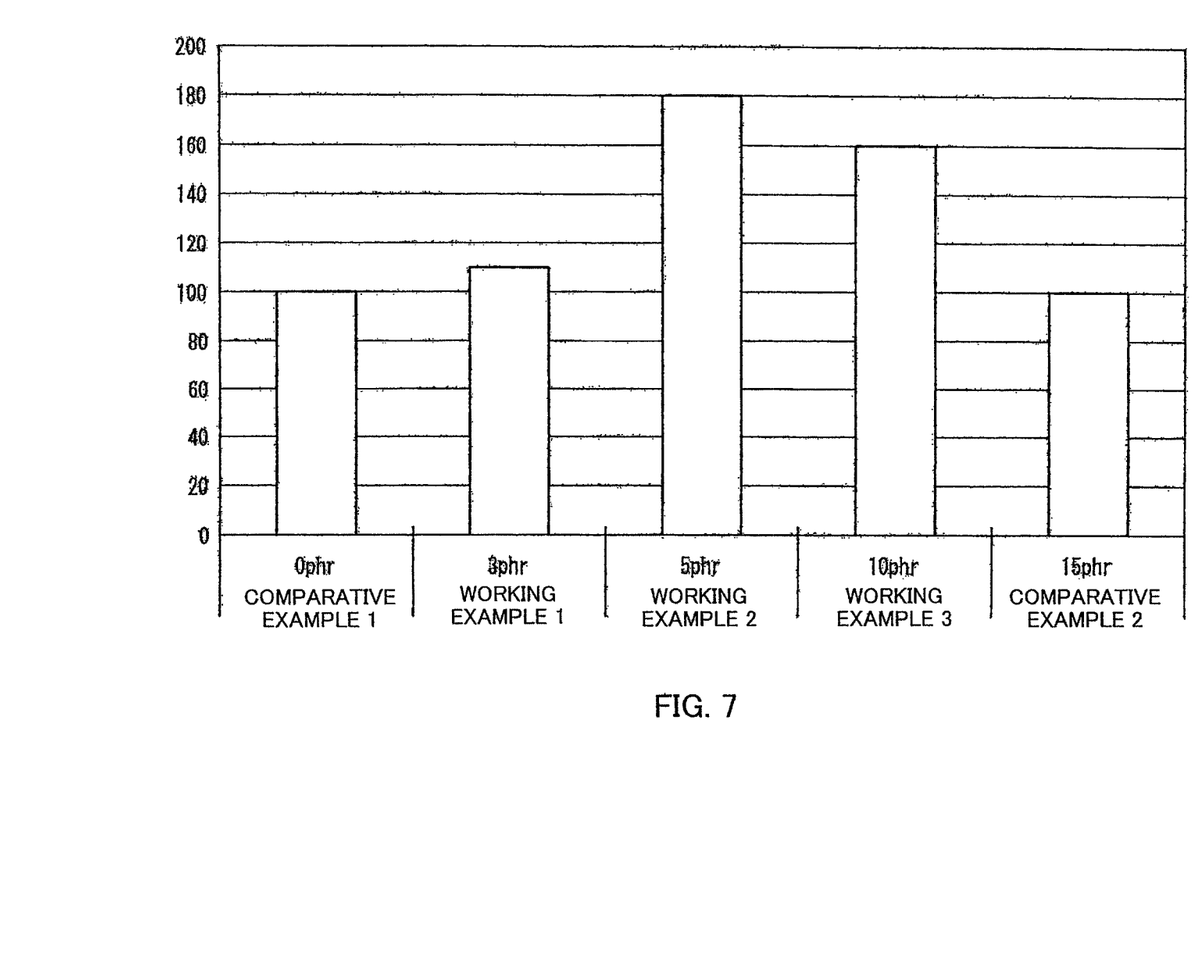
FIG. 7 is a bar chart showing the result of the durability performance test.

FIG. 6 illustrates the layout of an example of a power transmission system for an internal combustion engine. An endurance performance test was performed for the above-mentioned Working Examples and Comparative Examples on this power transmission system. The power transmission system 40 includes a drive pulley 41 connected to a crankshaft with the drive pulley having 20 teeth and measuring 60 mm in diameter, pulleys 42 and 43 that were connected to camshafts with each pulley having 40 teeth and measuring 121 mm in diameter, and a flat tensioner pulley 44 measuring 80 mm in diameter. The system was rotated at 4000 rpm under conditions where the toothed belt 10 was entrained about the pulleys 41-43 and tension was applied to the belt slack side span from the outside by the tensioner pulley 44 until an endurance time, at which the belt was damaged, was measured. Note that the test was performed at the ambient temperature of 120° C. Normalized belt endurance times for each of the Working Examples and the Comparative Examples are shown in FIG. 7 with 100 representing the endurance time for the belt of Comparative Example 1.

Further, noise generated during the operation of the toothed belt 10 was confirmed by a listener's unaided ear with the toothed belt 10 installed on the same power transmission system 40 utilized in the endurance performance tests. The results are listed in Table 5. In Table 5, "G" denotes when relatively less noise was generated while "N" denotes when relatively more noise was generated.

TABLE 5

| WORKING EXAMPLE 1 | WORKING EXAMPLE 2 | WORKING EXAMPLE 3 | COMPARATIVE EXAMPLE 1 | COMPARATIVE EXAMPLE 2 |
|---|---|---|---|---|
| G | G | G | N | N |

In each of the Working Examples, the value of tan δ under the conditions of 100-120° C. was in the range of 0.100-0.120 when 10 parts by weight of the high-density polyethylene were blended with the tooth rubber layer, and the adhesiveness between the tooth rubber layer and the tooth fabric was improved. Thereby, the durability of the toothed belt under high temperature conditions was improved and the noise performance during the belt operation was also improved. On the other hand, when the high-density polyethylene was not blended with the tooth rubber layer or when it was blended at parts by weight or more, the noise performance and the durability did not reflect sufficient improvement.

The invention claimed is:

1. A toothed belt comprising:
   a belt body in which one face is provided with at least a tooth portion and a tooth bottom portion alternately positioned in a belt longitudinal direction;
   the belt body comprising a tooth rubber layer provided along an outer periphery of the tooth portion provided on the one face; and
   the tooth rubber layer comprises a cured rubber composition containing between 3 and 10 parts by weight of high-density polyethylene with respect to 100 parts by weight of matrix rubber.

2. The toothed belt as claimed in claim 1, wherein the belt body further comprises a core rubber layer that is provided inside of the tooth portion and the tooth rubber layer is arranged to extend about a side of the core rubber layer.

3. The toothed belt as claimed in claim 2, wherein the core rubber layer has a higher modulus than a modulus of the tooth rubber layer.

4. The toothed belt as claimed in claim 3, wherein the core rubber layer is loaded with short fibers.

5. The toothed belt as claimed in claim 4, wherein the short fibers are evenly distributed within the core rubber layer.

6. The toothed belt as claimed in claim 5, wherein the short fibers are substantially oriented in the belt longitudinal direction in a vicinity of a top of the tooth portion and in a vicinity of the tooth bottom portion.

7. The toothed belt as claimed in claim 4, the short fibers comprising Aramid.

8. The toothed belt as claimed in claim 2, wherein the belt body comprises a backing rubber layer provided on an other face of the belt body that is opposite the one face; the core rubber layer is provided between the backing rubber layer and the tooth rubber layer; and a cord element extending in the belt longitudinal direction is embedded in a boundary between the core rubber layer and the backing rubber layer.

9. The toothed belt as recited in claim 8, further comprising an intermediate fabric provided within the backing rubber layer, extending in the belt longitudinal direction and spaced from the cord element.

10. The toothed belt as claimed in claim 1, further comprising a tooth fabric that covers an outer surface of the tooth portion, the tooth fabric comprising a fabric impregnated with rubber cement containing the high-density polyethylene.

11. The toothed belt according to claim 10, the tooth fabric comprising a corrugate shaped preform.

12. The toothed belt according to claim 10, the tooth fabric comprising a woven fabric.

13. The toothed belt according to claim 10, the tooth fabric comprising a woven fabric with a warp extending in the belt width direction and a weft extending in the belt longitudinal direction.

14. The toothed belt according to claim 13, the weft comprising a bicomponent filament yarn.

15. The toothed belt as claimed in claim 1, wherein the toothed belt is applied in an internal combustion engine.

16. The toothed belt as recited in claim 1, wherein a ratio of a loss modulus to a storage modulus of the tooth rubber layer is within a range of 0.10-0.12.

* * * * *